United States Patent
Puthiyandyil et al.

(10) Patent No.: US 7,225,236 B1
(45) Date of Patent: May 29, 2007

(54) LOAD BALANCING BETWEEN LNSS USING VIRTUAL LNS WITH MINIMAL LAC CONFIGURATION

(75) Inventors: Sanil Kumar Puthiyandyil, Schaumburg, IL (US); Shaji Radhakrishnan, Mount Prospect, IL (US); Rajesh Ramankutty, Schaumburg, IL (US); Satish Amara, Mount Prospect, IL (US)

(73) Assignee: 3Com Corporation, Marlborough, MA (US)

( * ) Notice: Subject to any disclaimer, the term of this patent is extended or adjusted under 35 U.S.C. 154(b) by 789 days.

(21) Appl. No.: 09/923,895

(22) Filed: Aug. 7, 2001

(51) Int. Cl.
*G06F 15/16* (2006.01)

(52) U.S. Cl. ...................... 709/218; 709/225

(58) Field of Classification Search ................ 709/239, 709/238, 235, 237, 200–203, 217–229, 245, 709/249; 370/237
See application file for complete search history.

(56) References Cited

U.S. PATENT DOCUMENTS

| | | | | |
|---|---|---|---|---|
| 6,058,421 A * | 5/2000 | Fijolek et al. | ............... | 709/225 |
| 6,370,121 B1 * | 4/2002 | Hausman | ..................... | 370/256 |
| 6,405,219 B2 * | 6/2002 | Saether et al. | ............... | 707/201 |
| 6,463,475 B1 * | 10/2002 | Calhoun | ..................... | 709/227 |
| 6,578,066 B1 * | 6/2003 | Logan et al. | ................ | 718/105 |
| 6,654,808 B1 * | 11/2003 | Chuah | ......................... | 709/227 |
| 6,704,282 B1 * | 3/2004 | Sun et al. | ..................... | 370/237 |
| 6,742,187 B1 * | 5/2004 | Vogel | .......................... | 725/126 |
| 6,768,716 B1 * | 7/2004 | Abel et al. | ................... | 370/230 |
| 6,795,867 B1 * | 9/2004 | Ma et al. | ..................... | 709/240 |
| 6,807,169 B2 * | 10/2004 | Mattathil | ..................... | 370/352 |
| 6,917,592 B1 * | 7/2005 | Ramankutty et al. | ....... | 370/237 |
| 7,023,879 B1 * | 4/2006 | Sitaraman et al. | .......... | 370/466 |
| 2001/0047415 A1 * | 11/2001 | Skene et al. | ................. | 709/226 |
| 2002/0052942 A1 * | 5/2002 | Swildens et al. | ........... | 709/223 |
| 2002/0101857 A1 * | 8/2002 | Heller | ......................... | 370/352 |
| 2002/0152322 A1 * | 10/2002 | Hay | ............................ | 709/245 |
| 2003/0028648 A1 * | 2/2003 | Calhoun | ..................... | 709/227 |
| 2005/0022203 A1 * | 1/2005 | Zisapel et al. | .............. | 718/105 |
| 2005/0086495 A1 * | 4/2005 | Sheth et al. | ................ | 713/182 |
| 2006/0112176 A1 * | 5/2006 | Liu et al. | ..................... | 709/223 |

OTHER PUBLICATIONS

Information Sciences Institute, "DARPA Internet Program Protocol Specification", RFC: 791, Sep. 1981, pp. 1-45.
F. Baker, "Requirements For IP Version 4 Routers", RFC: 1812, Jun. 1995, pp. 1-99.

* cited by examiner

*Primary Examiner*—Moustafa M. Meky
(74) *Attorney, Agent, or Firm*—McDonnell Boehnen Hulbert & Berghoff

(57) ABSTRACT

A system for load balancing, the system includes a LAC, a contact LNS, and a plurality of load balancing LNSs. The LAC includes a contact LNS address, the contact LNS address specifies the address of a contact LNS. The contact LNS is communicatively coupled to the LAC and the plurality of load balancing LNSs are communicatively coupled to the contact LNS and to the LAC. The LAC sends a message to the contact LNS, the message informing the LAC of its availability and the contact LNS sends a response message containing IP address of a selected one of the plurality of load balancing LNSs to which the LAC should establish a session.

23 Claims, 5 Drawing Sheets

| CODE 602 | IDENTIFIER 604 | LENGTH 606 |
|---|---|---|
| LNS-IP-ADDRESS 608 ||| 
| AUTHENTICATOR 610 |||
| ATTRIBUTES 612 |||

LOAD BALANCING BETWEEN LNSS USING VIRTUAL LNS WITH MINIMAL LAC CONFIGURATION

FIELD OF THE INVENTION

This present invention relates to load balancing in computer networks. More specifically, it relates to load balancing between L2TP Network Servers (LNSs) in networks.

BACKGROUND OF THE INVENTION

Computer networks have become widely used in society today. Different types of devices may be coupled to these networks. Protocols have been developed to facilitate communications between the devices across these networks. For example, the point-to-point protocol (PPP) may be used.

In PPP connections, a point-to-point link may be established. In order to establish communications over a point-to-point link, each end of the link may first send packets that help configure the link. After the link has been established, the link can be authenticated before the transmission of packets. The PPP provides a standard method of encapsulating Network Layer protocol information over point-to-point links. PPP may be used to encapsulate data over data link connections; establish, configure, and test the data link connection; and establish and configure different network-layer protocols.

PPP may be tunneled using the L2TP protocol. The L2TP protocol is a protocol established by the Internet Engineering Task Force (IETF). User devices may be coupled to a L2TP Access Concentrator (LAC). The LAC is coupled to a network, for example, the Internet. The LAC may be coupled to other networks, as well. The network is coupled to a L2TP Network Server (LNS). The LNS may be coupled to other types of networks or devices, as well.

In a tunneling, a payload of data may be transferred from a node in the first network using the connections of a second network. The data payloads may be frames or packets conforming to any protocol. Instead of sending a frame as it is produced by the node in the first network, the frame may be encapsulated in an additional header. The additional header may provide routing information so that the encapsulated payload can traverse the second network.

The encapsulated packets may then be routed between tunnel endpoints over the second network via the tunnel. Once the encapsulated frames reach their destination endpoint, the frame may be unencapsulated and forwarded to its final destination.

A tunnel comprises a communication path between a LNS-LAC pair and may, for example, carry PPP datagrams between the LAC and the LNS. In addition, multiple sessions may be multiplexed over a single tunnel. A control connection operating in-band over the same tunnel controls the establishment, release, and maintenance of sessions and of the tunnel itself.

Control messages, for example, in a L2TP packet format, may be sent over a tunnel between a LNS and a LAC. To maximize extensibility while still permitting interoperability, a uniform method for encoding message types and bodies may be used. This encoding may be, for example, in the Attribute-Value Pair (AVP) format. The AVP may include a type field, a length field, and a value field. Other examples of messages and field values are possible. Other types of formats are possible.

Control messages may be used to establish and clear user sessions. For example, control messages are used to maintain the control connection itself. The control connection is initiated by an LAC or LNS after establishing the underlying tunnel-over-media connection.

Control messages may be sent as packets on the established tunnel connection between a given LNS-LAC pair. All data is sent in network order (high order octets first). Each control message may have a header, for example, including an AVP indicating the type of control message, followed by one or more AVPs appropriate for the given type of control message. The control messages may have other fields and use other formats, as well.

Various types of control messages are sent between the LAC and the LNS. For instance, the Start-Control-Connection-Request (SCCRQ) is an L2TP control message used to initialize the tunnel between an LNS and an LAC. The tunnel must be initialized through the exchange of these control messages before any other L2TP messages can be issued. The establishment of the control connection is started by the initiator of the underlying tunnel.

Another example of a control message sent between the LNS and the LAC is the Start-Control-Connection-Reply (SCCRP). The SCCRP message is an L2TP control message sent in reply to a received Start-Control-Connection-Request message. Sending this message indicates that the request was successful.

SUMMARY OF THE INVENTION

The system and method of the present invention advantageously allows a system to achieve load balancing in a network. Specifically, the system and method of the present invention achieves this load balancing by maintaining a minimum amount of storage of information in a LAC.

In one example of the present invention, a system includes a LAC, a contact LNS, and a plurality of load balancing LNSs. The LAC may include a contact LNS address, and the contact LNS address may specify the address of a contact LNS. The contact LNS is communicatively coupled to the LAC and the plurality of load balancing LNSs are communicatively coupled to the contact LNS and to the LAC. The LAC may send a message to the contact LNS. The message may inform the LNS of the availability of the LAC for participating in load balancing. The contact LNS may send a response message containing IP address of a selected one of the plurality of load balancing LNSs to which the LAC should establish a session.

In another example of the present invention, a LAC is coupled to a CPE. A first network is coupled to the LAC and a second network coupled to the first network. A contact LNS is coupled to the first network. A next LNS coupled to the second network, the next LNS having an IP address.

The LAC may send a message to the contact LNS via the first network. The message may inform the contact LNS of the availability of the LAC to participate in the LNS load-balancing. The contact-LNS may send a response message. The response message may contain the IP address of the next LNS. The LAC may establish a connection with the next LNS via the second network.

These as well as other features and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
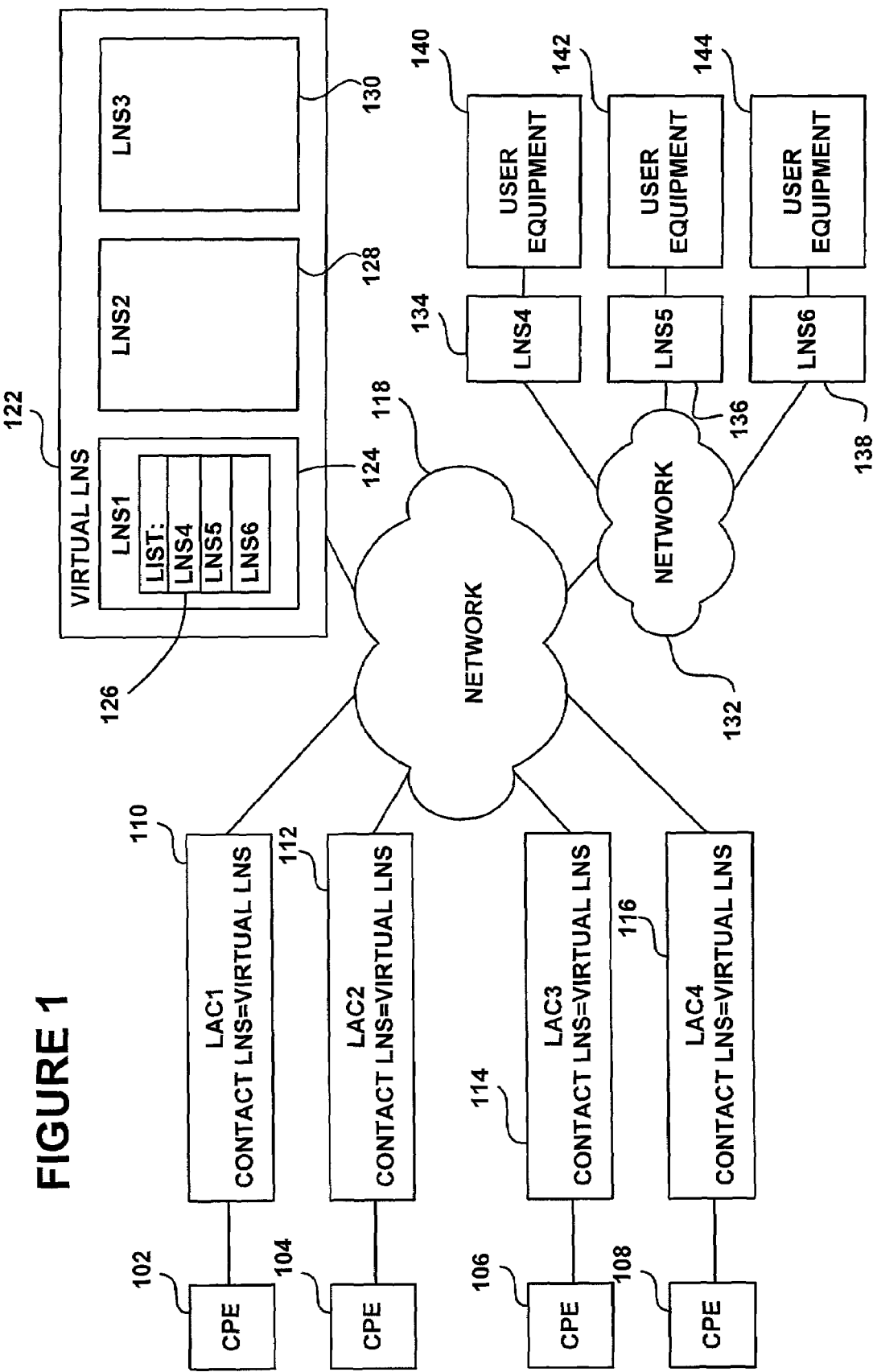
FIG. 1 is a diagram illustrating a preferred embodiment of the system for achieving load balancing in accordance with the present invention.

Referring now to FIG. 1, a system includes customer premise equipment (CPE) 102, CPE 104, CPE 106, and CPE 108, a first L2TP local access concentrator (LAC) 110, a LAC 112, a LAC 114, a LAC 116, a network 118, a virtual LNS 122, a network 132, LNSs 134, 136, and 138, and user equipments 140, 142, and 144.

The LAC 110 has an address of "LAC1." The LAC 112 has an address of "LAC2." The LAC 114 has an address of "LAC3." The LAC 116 has an address of "LAC4." Each of the LACs 110, 112, 114, and 116 has a contact LNS pointer, which points to the virtual LNS 122. The virtual LNS 122 includes a first LNS 124 (with an address of LNS1), a second LNS 128 (with and address of LNS2), and a third LNS 130 (with an address of LNS3). The LNS 124 includes a list 126. The list 126 includes a list of three LNSs including a LNS4, a LNS5, and a LNS6.

The CPEs 102, 104, 106, and 108 are each coupled to a LAC, respectively, LACs 110, 112, 114, and 116. The LACs 110, 112, 114, 116 are coupled to the network 118. The network 118 is coupled to the virtual LNS 122 and the network 132. The network 132 is coupled to the LNSs 134, 136, and 138. The LNSs 134, 136, and 138 are coupled to user equipments 140, 142, and 144.

The CPEs 102, 104, 106, and 108 can be any type of devices that a user maintains to both transmit and receive any type of information. They may be a computer, data entry device, or telephone, for example. The CPEs may communicate using any protocol, for example, the point-to-point protocol (PPP). The CPEs 102, 104, 106, and 108 may be other types of devices, as well.

The LACs 110, 112, 114, and 116 are attached to the network 118 and may implement the L2TP protocol. The LACs 110, 112, 114, and 116 may also implement the media over which L2TP is to operate and pass traffic from the CPEs 102, 104, 106, and 108 to the network 132 or the virtual LNS 122. The LACs 110, 112, 114, or 116 may be the initiator of incoming calls from the network 118 and the receiver of outgoing calls to the network 118. The LACs 110, 112, 114, and 116 may perform other functions, as well. In addition, the LACs 110, 112, 114, and 116 may be any type of access concentrator that implements any type of protocol.

A tunnel may be maintained between any of the LACs 110, 112, 114, and 116 and the virtual LNS 122 (and any of the LNSs 124, 128, and 130 represented by the virtual LNS 122), and the LNSs 134, 136, and 138.

The LACs may request that a connection be established between the LACs and the LNSs, for example, using a SCCRQ message. In reply, the LNS may grant the request, for example, using a SCCRP message. The address of the LNS may be included in the reply from the LNS. For example, the LNS may send a new AVP (with the reply) containing the IP address of the LNS. The address of the LNS informs the LAC of the availability of a LNS, which can be used to achieve high availability and/or load balancing.

The networks 118 and 132 may be any type of networks that can transport any type of information. For example, it may be an IP network, the Internet, an Intranet, the public switched telephone network (PSTN) or a wireless network. In addition, the network 118 may be any combination of any number of networks. Other types of networks are also possible. In one example, the network 118 is the Internet and the network 132 is an Intranet.

The networks 118 and 132 may be any type of network used to transmit any type of information. For example, they may be IP networks, an Internet, a PSTN, or a wireless network. They may also be local area networks (LANs) or wide area networks (WANs) or have any other type of configuration. In addition, the networks 118 and 132 may be combinations of networks.

The LNSs 124, 128, 130, 134, 136, and 138 may operate any platform capable of point-to-point protocol (PPP) termination. The LNSs 124, 128, 130, 134, 136, and 138 may have a plurality of interfaces to provide communication with a variety of networks, for example, LAN interfaces or WAN interfaces. The LNSs 124, 128, 130, 134, 136, and 138 may be the initiator of outgoing calls to the networks 118 or 132 and the receiver of incoming calls from the networks 132 or 118.

The LNSs and LACs maintain states for each user and each session that is attached to the LAC. A session is created when an end-to-end PPP connection is attempted between the CPE and the LNS, or when an outbound call is initiated. A tunnel may contain a plurality of sessions.

The tunnels that carry information between the LACs and the LNSs may be L2TP tunnels. For example, the tunnels may carry control messages.

The virtual LNS 122 may include a one or more contact LNSs. One of the plurality of LNSs may be the current LNS used as the contact LNS. The contact LNS includes the table 126. The table includes a list of available LNSs that may be used to provide LNS functions when the contact LNS determines that it no longer is able or desires to act as an LNS.

If multiple contact LNSs are present to form a single virtual LNS, the contact LNSs may share a single contact LNS address between them. The multiple virtual LNSs may execute a router redundancy protocol, for example, the virtual router redundancy protocol (VRRP) between the contact LNSs.

The user equipments 140, 142, and 144 may be any type of device that is used to transmit and/or receive any type of information. For example, the user equipments 140, 142, and 144 may be telephone, a wireless device, or a computer. Other types of user equipment are possible.

In one example of operation of the system of FIG. 1, information may be transmitted from one of the CPEs 102, 104, 106, or 108 to a destination. The destination may be user equipment 140, 142, or 144. Other destinations are possible.

One of the LACs 110, 112, 114, or 116 may determine the contact LNS. For example, the LAC 110, 112, 114, or 116 may determine the LNS 124, 128, or 130 within the virtual LNS 122 as the currently active contact LNS.

The LAC 110, 112, 114, or 116 may establish a control channel with the contact LNS. The contact LNS may determine whether the contact LNS can handle the session. The contact LNS may determine the capability of the LAC 110, 112, 114, or 116. For example, the LAC 110, 112, 114, or 116 may inform the contact LNS whether the LAC 110, 112, 114, or 116 is capable of performing load balancing.

If the LAC 110, 112, 114, or 116 is capable of performing load balancing, the contact LNS may send the LAC 110, 112, 114, or 116, the address of the next LNS available from the list 126. The LAC 110, 112, 114, or 116 may establish a tunnel with the next LNS.

The group of LNSs 124, 128, or 130 may implement a keep-alive mechanism to determine whether all the configured LNSs are functionally available or not. The keep-alive mechanism may be implemented by using a ICMP keep-alive or by sending proprietary messages over the User Datagram Protocol (UDP). If ICMP keep-alive is used, the virtual LNS 122 may determine the load-balancing LNSs availability. Using the proprietary messages approach, the load-balancing LNSs 134, 136, or 138 can inform the virtual LNS 122 about the availability as well as the load factor and other parameters. This helps the virtual LNS 122 to make a decision in selecting a new LNS IP address in a dynamic manner.

Figure 2:
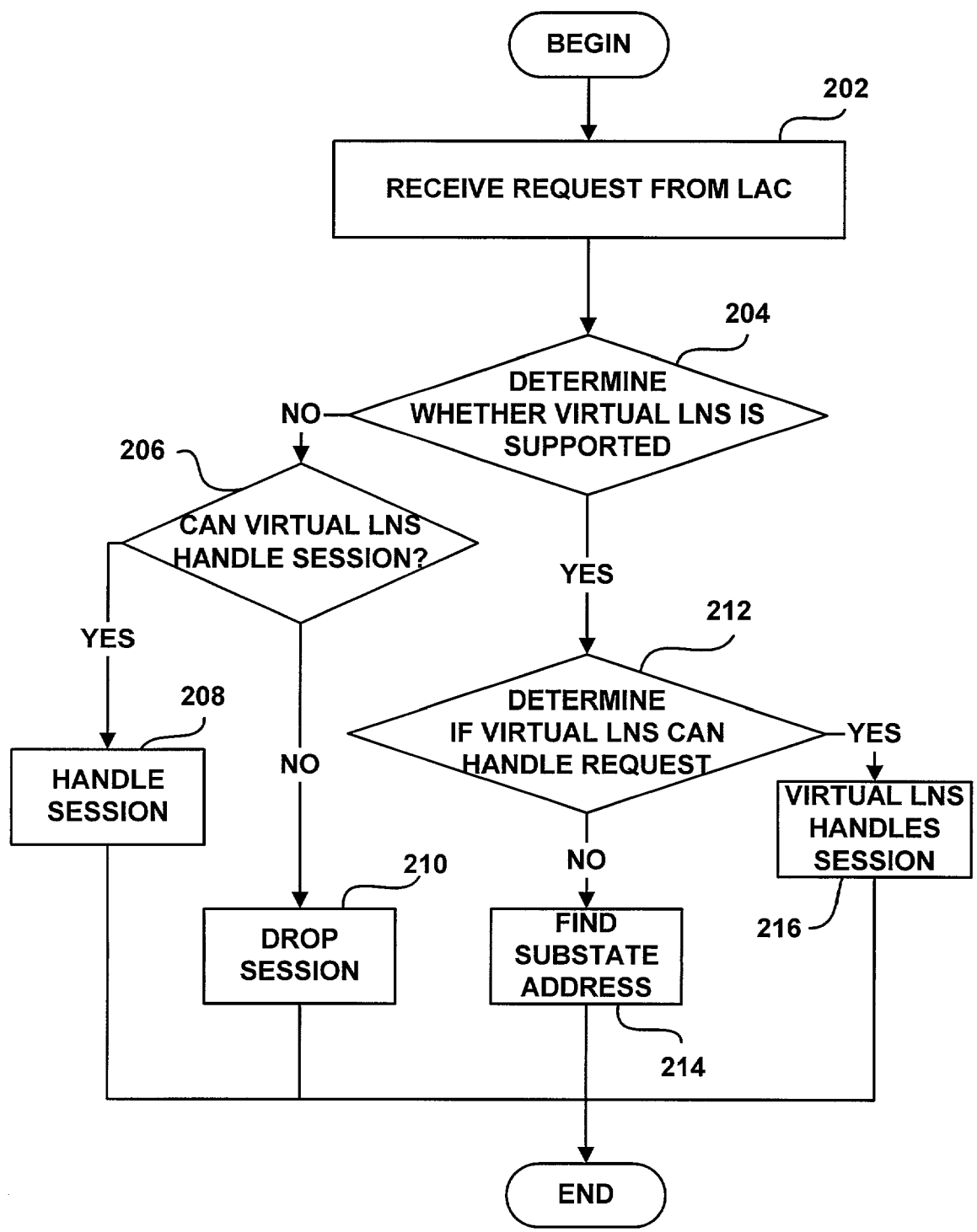
FIG. 2 is a block diagram of a LAC in accordance with a preferred embodiment of the present invention.

Referring now to FIG. 2, a flowchart showing one example of the operation of a contact LNS is described.

At step 202, the contact LNS receives information indicating that a LAC is available for load balancing during a session.

At step 204, it is determined whether the system supports a virtual LNS. In one example, the contact LNS may send a message to the LAC indicating whether it can handle the session. For example, the message may be in the form of an incoming response call (ICRP) or Connection Disconnect Notification (CDN). Other examples of message formats are possible. If the answer at step 204 is affirmative, then execution continues at step 212. If the answer is negative, then execution continues at step 206.

At step 206, the virtual LNS (or a physical LNS within the virtual LNS) determines whether it can handle the session. For example, the virtual LNS may determine whether it is overloaded and, therefore, cannot handle a session. Other examples of circumstances where a virtual LNS cannot handle a session are possible. If the answer at step 206 is affirmative, then execution continues at step 208. If the answer is negative, then execution continues at step 210.

At step 208, the LNS handles the session, for example, by sending an ICRP. Alternatively, at step 210, the session is dropped.

At step 212, it is determined whether the information indicates that the LAC is available for load balancing or whether the LAC is unavailable. If the answer is affirmative (i.e., the LAC is available), then execution continues at step 216. If the answer negative (i.e., the LAC is unavailable), then execution continues at step 214.

At step 214, the contact LNS obtains the address of the next LNS. The LNS transmits the address of the next LNS. Execution then ends.

At step 216, the virtual LNS handles the session. For example, one of the physical LNSs within the virtual LNS handles the session. Execution then ends.

Figure 3:
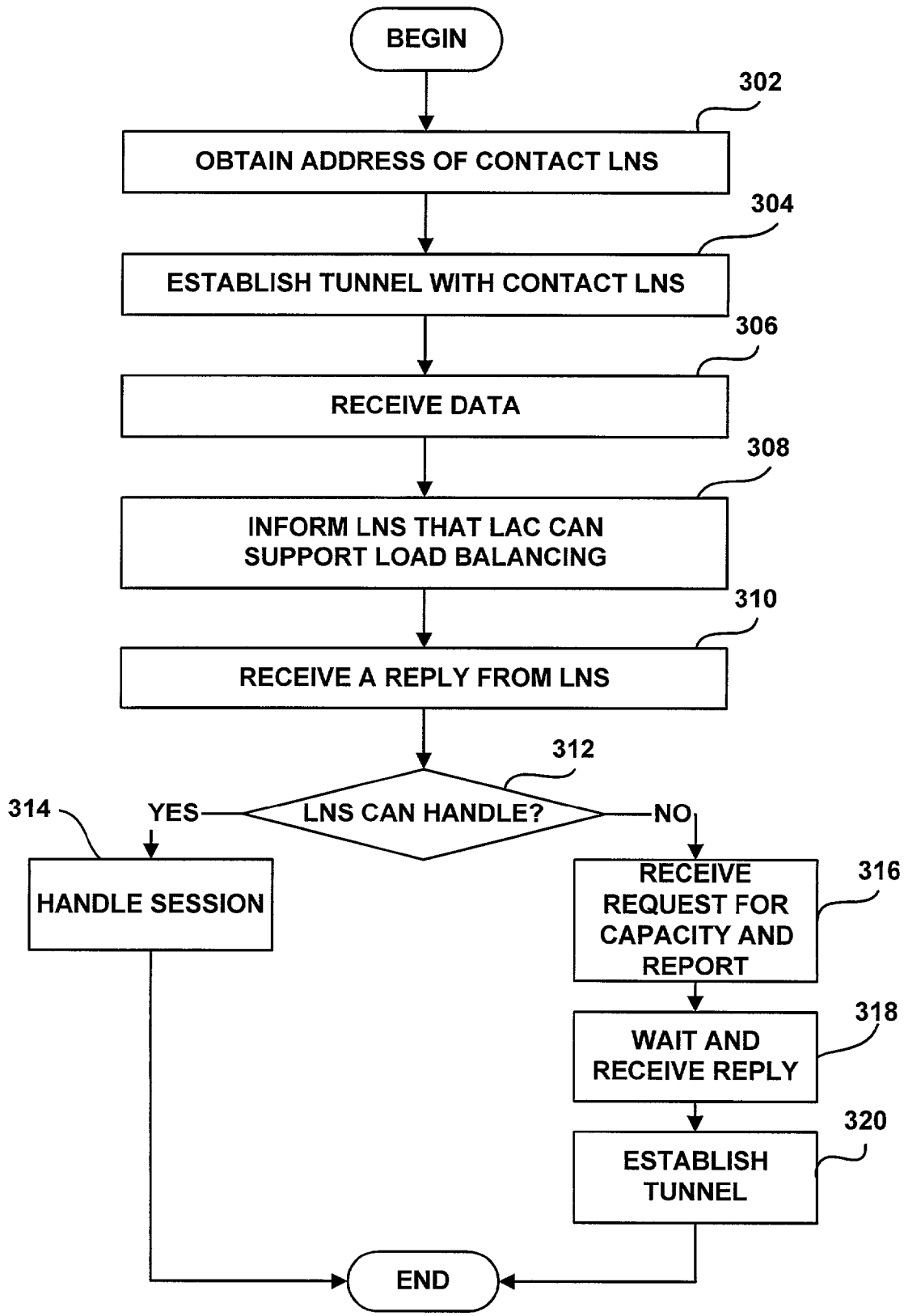
FIG. 3 is a block diagram of a LNS in accordance with a preferred embodiment of the present invention.

Referring now to FIG. 3, a flowchart of one example of the operation of a LAC is described. The LAC may be coupled to a contact LNS. The contact LNS may be part of a virtual LNS. Other LNSs may also be coupled to the LAC including a next LNS.

At step 302, the LAC obtains the address of a contact LNS. For example, the address of the contact LNS may be stored in a permanent memory. The address of the contact LNS may be stored in other media, as well. The address may be an IP address. However, other formats and types of addresses may also be used.

At step 304, the LAC establishes a tunnel with the contact LNS. The tunnel may be a control channel that is used to route control information to the contact LNS.

At step 306, the LAC receives data. The data may be requested to be delivered to the mobile.

At step 308, the LAC informs the contact LNS (via the control channel) that the LAC can support load balancing.

At step 310, the LAC waits to receive a reply from the contact LNS that will inform the LAC whether or not the contact LNS may decide to establish a session or may decide that it will not establish a session. The reasons for not establishing a session may include that it is overloaded, for instance.

At step 312, the LAC determines the identity of the contact LNS may handle the session. If the answer is affirmative, then execution continues at step 314. If the answer is negative, then execution continues at step 316.

At step 314 (the reply is that the contact LNS will handle the session), the contact LNS handles the session. Execution then ends.

At step 316 (the reply is that the contact LNS will not handle the session), the contact LNS determines the capability of the LAC. For example, the LAC may receive a request to report the LAC's capacity to the LNS and then report its capacity. The capacity may indicate that the LAC is available for load balancing.

At step 318, the LAC waits for a reply from the contact LNS. The reply includes the address of the next LNS to be used.

At step 320, the LAC establishes a tunnel (e.g., a control channel) with the next LNS on a list of LNSs and a session is established between the next LNS and the LAC. Execution then ends.

Figure 4:
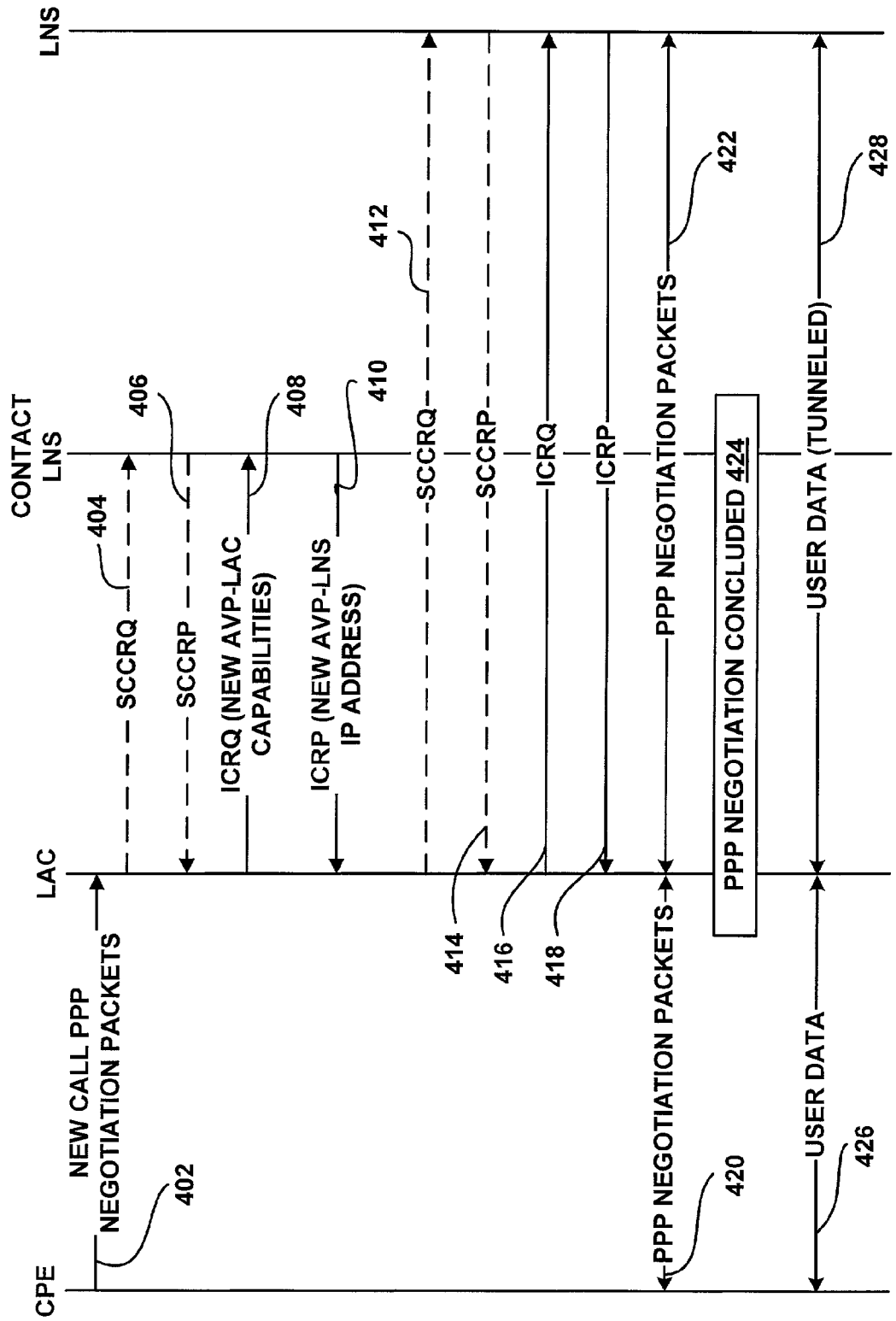
FIG. 4 is a call flow diagram in accordance with a preferred embodiment of the present invention.

Referring now to FIG. 4, a call flow diagram illustrating one example of the operation of a system including CPE, a LAC, a contact LNS, and a next LNS is described.

At step 402, a new call is established between the CPE and the LAC. In one example, PPP negotiation packets are exchanged in establishing the new call.

At step 404, an SCCRQ message is sent from the LAC to the contact LNS. The SCCRQ message includes information such as the name of the LAC and the capabilities of the LAC.

At step 406, an SCCRP message is sent from the contact LNS to the LAC. The SCCRP message includes information such as the name and capabilities of the LAC.

At step 408, an Incoming Call Request (ICRQ) message is sent from the LAC to the contact LNS. The ICRQ message may indicate a new AVP, which indicates the capabilities of the LAC.

At step 410, an Incoming Call Response (ICRP) message is sent from the contact LNS to the LAC. The ICRP message may indicate a new AVP and the IP address of the next-available LNS.

At step 412, an SCCRQ message is sent from the LAC to the next LNS. The purpose of this message is to open an L2TP tunnel control connection between the LAC and an LNS.

At step 414, an SCCRP message is sent from the next LNS to the LAC. The purpose of this message is to acknowledge the SCCRQ message.

At step 416, an ICRQ message is sent from the LAC to the next LNS. The purpose of this message is to open an L2TP session between the LAC and an LNS.

At step 418, an ICRP message is sent from the next LNS to the LAC. The purpose of this message is respond to the ICRQ message.

At step 420, PPP negotiation packets are exchanged between the CPE and the LAC. The PPP negotiation packets may establish a session between the CPE and the LAC.

At step 422, PPP negotiation packets are exchanged between the LAC and the next LNS. The PPP negotiation packets may establish a session between the LAC and the next LNS.

At step 424, the PPP negotiation is concluded. At step 426, user data is exchanged between the CPE and the LAC. At step 428, the user data is exchanged between the LAC and the LNS.

Figure 5:
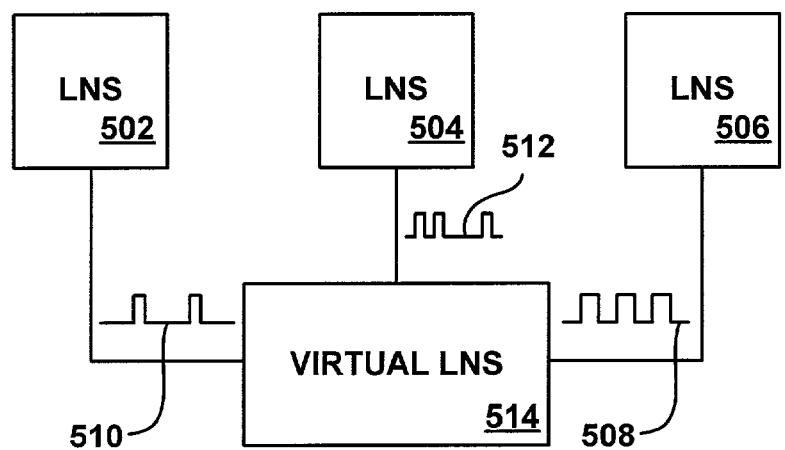
FIG. 5 is a block diagram of a virtual LNS in accordance with a preferred embodiment of the present invention.

Referring now to FIG. 5, a set of load-balancing LNSs 502, 504, 506 transmit heartbeat signals 510, 512, and 508, respectively, to a virtual LNS 514. A heartbeat mechanism may also be used to determine the availability of the load balancing LNSs. The load-balancing LNSs 502, 504, and 506 may be configured with a primary virtual LNS IP address and UDPO port number. The load-balancing LNSs 502, 504, and 506 may relay a heartbeat signal at regular intervals to the virtual LNS. The heartbeat signal may be a proprietary message over UDP. This signal includes information, for example, the load factor and other parameters of the load-balancing LNSs.

The participating LNSs 502, 504, and 506 may share a password to ensure validity of the heartbeat messages. The virtual LNS 514 on receiving the heartbeat signal may be able to determine the availability of the load-balancing LNS as well as the load factor in the load-balancing LNS. In this way, the configuration in the participating LNSs may be minimal.

The virtual LNS 514 may listen for the heartbeat signal on a USP port and keeps a list of the load balancing LNSs and the corresponding load-matrix. The virtual LNS 514 may also keep a heartbeat-inactivity timer for each of the load balancing LNSs 502, 504, and 506. In one example, when the heartbeat inactivity timer expires due to N consecutive heartbeats missed (where N is some integer value), the load balancing LNS 504, 504, or 506 is removed from the list of available load-balancing LNSs. When a new LNS tunnel is requested by one of the LACs, the virtual LNS 514 selects a load balancing LNS 502, 504 or 506 from the list of available load balancing LNSs. The selection decision may be made based upon the load factor and other factors such as the geographical location of the LNS providing a dynamic selection process.

Figure 6:
FIG. 6 is a diagram of an accounting request packet in accordance with a preferred embodiment of the present invention.

The heartbeat message may be in the form of an accounting request packet. Referring now to FIG. 6, the accounting request packet 600 made include a code field 602, an identifier field 604, a length field 606, an LSN-IP-address field 608, an authenticator field 610, and an attributes field 612.

The code field 602 may be on octet and identify the type of message. When a message is received with an invalid code field, it may be discarded. In one example, heartbeat messages may be assigned "51" for a heartbeat request and "52" for a heartbeat response. The heartbeat request message may be sent from the load-balancing LNS to the virtual LNS and the heartbeat response message may be sent from the virtual LNS to the load-balancing LNS.

The identifier field 604 may, in one example, be a one-octet field that aids in matching requests and replies. The RADIUS server may detect a duplicate request if it has the same source client source IP address and source UDP port and identifier within a predetermined amount of time.

The length field 606, in one example, may be two octets in length. This field may indicate the length of a packet including the code field, the identifier field, the length field, the authenticator field, and the attribute field. Octets outside the range of the length field may be treated as padding and ignored on reception. If the packet is shorter than indicated by the length field, it may be silently discarded. In one example, the minimum length is 20 and the maximum length is 2045. Other examples are possible.

The LNS-IP-address field 608 indicates the IP address of the load balancing LNS in the case of the heartbeat request message and the IP address of the virtual LNS in the case of the heartbeat response message.

The authenticator field 610, in one example, may be 16 octets in length. The most significant octet may be transmitted first. This value may be used to authenticate the messages between the participating LNSs. The authenticator field in the message may include a one-way MD5 hash calculated over a stream of octets consisting of the code, identifier, length, 16 zero octets, attributes, shared secrets. The 16-octet MD5 hash value may be stored in the authenticator field of the message.

The attributes field 612 may be a variable length field and may include a list of attributes. In one example, the attributes field includes a type, length, and value sub-fields, The type sub-field may itself be divided further. For instance, the type sub-field may include a portion indicating the maximum number of L2TP sessions supported. The type sub-field may also include a portion indicating the LNS number of sessions presently connected. These two portions may be used to determine the load factor of a load-balancing LNS. The type field may also include a portion indicating the heartbeat frequency, for instance, in milli-seconds.

The length sub-field may indicate the length of the attributes field and the value sub-field may indicate information specific to an attribute.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for load balancing may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for load balancing, the system comprising:
   a contact L2TP Network Server (LNS) that can determine whether to establish a session between the contact LNS and an L2TP Access Concentrator (LAC), the contact LNS being communicatively coupled to the LAC;
   the LAC, the LAC including an address of the contact LNS, the LAC using the address of the contact LNS to send to the contact LNS at least a first message to request establishment of the session between the contact LNS and the LAC and to inform the contact LNS of the availability of the LAC for participating in load balancing; and
   a plurality of load balancing LNSs communicatively coupled to the contact LNS and to the LAC,
   wherein if the contact LNS determines the contact LNS can handle establishing the requested session, the contact LNS establishes the requested session with the LAC, and
   wherein if the contact LNS determines the contact LNS cannot handle establishing the requested session, the contact LNS sends to the LAC a response message containing an Internet Protocol (IP) address of a selected load balancing LNS of the plurality of load balancing LNSs to which the LAC should establish a session.

2. The system of claim 1 wherein the contact LNS is included within a virtual LNS.

3. The system of claim 1, wherein the at least a first message to request establishment of the session between the contact LNS and the LAC and to inform the contact LNS of the availability of the LAC for participating in load balancing includes an Incoming Call Request (ICRQ) message.

4. The system of claim 1 wherein the response message is an Incoming Call Response (ICRP) message.

5. The system of claim 1 further including a customer premise equipment (CPE) coupled to the LAC.

6. The system of claim 1, wherein the contact LNS includes a list of LNSs available to provide LNS functions if the contact LNS determines the contact LNS cannot handle a session with the LAC.

7. The system of claim 1, wherein each of the plurality of load balancing LNSs transmits heartbeat signals to the contact LNS so that the contact LNS can determine which LNSs of the plurality of load balancing LNSs are available to participate in load balancing.

8. A method of load balancing, the method comprising:
   using an address of a contact L2TP Network Server (LNS) to establish an L2TP tunnel between the contact L2TP Network Server (LNS) and an L2TP Access Concentrator (LAC), the LAC containing the address of the contact LNS;
   sending to the contact LNS from the LAC at least a first message to request establishment of a session between the contact LNS and the LAC and to inform the contact LNS that the LAC can participate in load balancing; and
   determining whether the contact LNS can handle the session between the contact LNS and the LAC,
   wherein, if the contact LNS can handle the session between the contact LNS and the LAC, the method further comprises establishing the session between the contact LNS and the LAC, and
   wherein, if the contact LNS cannot handle the session between the contact LNS and the LAC, the method further comprises the LAC: (i) receiving from the contact LNS an address of a next available LNS, (ii) establishing a connection with the next available LNS, and then establishing a session with the next available LNS, and (iii) receiving data and forwarding the data to the next available LNS.

9. The method of claim 8, wherein the at least a first message to request establishment of a session between the contact LNS and the LAC and to inform the contact LNS that the LAC can participate in load balancing includes an Incoming Call Request (ICRQ) message.

10. The method of claim 9 wherein the address of the next available LNS is included in an Incoming Call Response (ICRP) message.

11. The method of claim 9 wherein the contact LNS is included in a virtual LNS.

12. The method of claim 8, wherein the at least a first message to request establishment of a session between the contact LNS and the LAC and to inform the contact LNS that the LAC can participate in load balancing comprises a Start-Control-Connection-Request (SCCRQ) message.

13. The method of claim 9, wherein the ICRQ message comprises an attribute-value pair that indicates the LAC is capable of performing load balancing.

14. A method for load balancing between a contact L2TP Network Server (LNS), an L2TP Access Concentrator (LAC), and a next LNS, the method comprising:
    sending to the contact LNS from the LAC at least a first message to request establishment of a session between the contact LNS and the LAC and to inform the contact LNS that the LAC can participate in load balancing;
    at the contact LNS, determining whether the contact LNS can handle the L2TP session between the contact LNS and the LAC;
    sending to the LAC from the contact LNS at least a second message that (i) indicates whether the contact LNS can handle the L2TP session between the contact LNS and the LAC, and (ii) contains an address of the next LNS if the contact LNS cannot handle the L2TP session between the contact LNS and the LAC;
    wherein, if the contact LNS can handle the L2TP session between the contact LNS and the LAC, the method further comprises establishing the L2TP session between the contact LNS and the LAC; and
    wherein if the contact LNS cannot handle the L2TP session between the contact LNS and the LAC, the method further comprises establishing a connection between the next LNS and the LAC using the next LNS address, and then establishing an L2TP session between the next LNS and the LAC.

15. The method of claim 14 wherein the contact LNS is included in a virtual LNS.

16. The method of claim 15 including the further step of determining the identity of the contact LNS within the virtual LNS.

17. The method of claim 14,
    wherein if the contact LNS can handle the L2TP session, then after establishing the L2TP session between the contact LNS and the LAC, the method further comprising sending user data between (i) the LAC and the contact LNS, and (ii) the LAC and a customer premises equipment (CPE), and wherein if the contact LNS cannot handle the L2TP session, then after establishing the session between the next LNS and the LAC, the method further comprising sending user data between (i) the LAC and the next LNS, and (ii) the LAC and the CPE.

18. The method of claim 14, wherein the function of determining whether the contact LNS can handle the L2TP session includes determining whether the contact LNS is overloaded.

19. A system for load balancing, the system comprising:
a Customer Premise Equipment (CPE);
an L2TP Access Concentrator (LAC) coupled to the CPE;
a first network coupled to the LAC;
a second network coupled to the first network;
a contact L2TP Network Server (LNS) coupled to the first network; and
a next LNS coupled to the second network, the next LNS having an Internet Protocol (IP) address,
wherein the LAC sends to the contact LNS via the first network a message informing the contact LNS of the availability of the LAC for participating in load balancing,
wherein the contact LNS determines whether the contact LNS can handle a session with the LAC,
wherein if the contact LNS determines the contact LNS can handle the session, the contact LNS establishes the session with the LAC, and
wherein if the contact LNS determines the contact LNS cannot handle the session, the contact LNS sends to the LAC a message containing the IP address of the next LNS, and the LAC establishes a session with the next LNS via the second network.

20. The system of claim 19 wherein the contact LNS includes a table and the address of the next LNS is stored in the table.

21. The system of claim 19 wherein the contact LNS is included in a virtual LNS.

22. A system for load balancing, the system comprising:
means for an L2TP Access Concentrator (LAC) to obtain an address of a contact L2TP Network Server (LNS);
means for sending to the contact LNS from the LAC a message that indicates the LAC is available for participating in load balancing;
means for receiving from the contact LNS an address of a next available LNS;
means for establishing a connection and a session with the next available LNS; and
means for receiving data and forwarding the data to the next available LNS.

23. A computer readable medium for an L2TP Access Concentrator (LAC), the computer readable medium having stored therein program code executable by a processing unit of the LAC, the program code comprising:
first program code for causing the LAC to obtain an address of a contact L2TP Network Server (LNS);
second program code for causing the LAC to send to the contact LNS at the address of the contact LNS a message that indicates the LAC is available for participating in load balancing;
third program code for receiving from the contact LNS an address of a next available LNS;
fourth program code for establishing a connection and a session with the next available LNS; and
fifth program code for receiving data and forwarding the data to the next available LNS.

* * * * *